March 16, 1926.

E. E. GREGORY 1,576,649

MOTOR FOR ANIMATED ADVERTISING SIGNS

Filed Feb. 26, 1925    2 Sheets-Sheet 1

Inventor

Eli E. Gregory.

By Mason Fenwick & Lawrence
Attorneys

March 16, 1926.  
E. E. GREGORY  
1,576,649  
MOTOR FOR ANIMATED ADVERTISING SIGNS  
Filed Feb. 26, 1925  2 Sheets-Sheet 2  
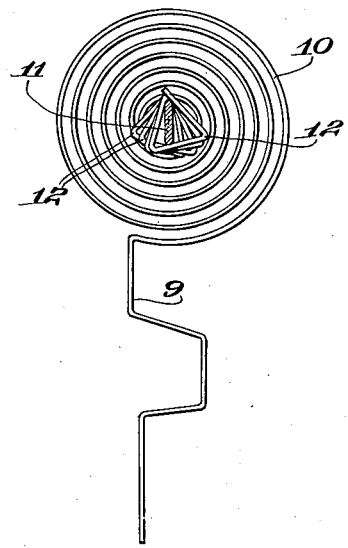
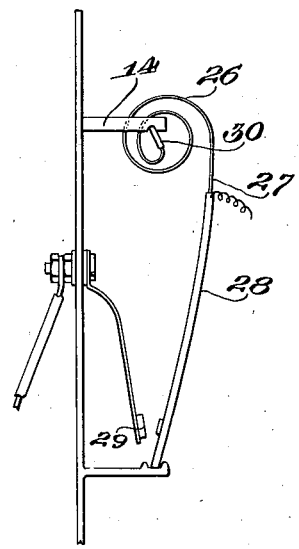
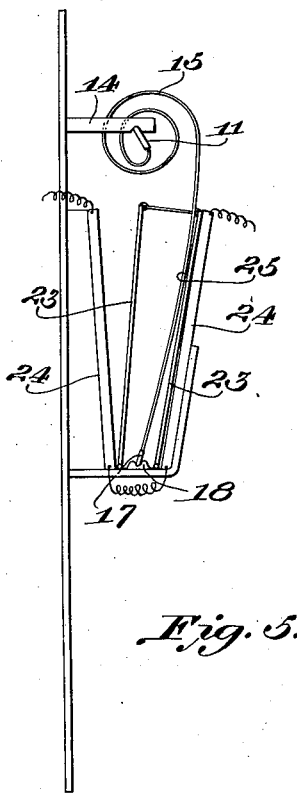
Inventor  
Eli E. Gregory.  
By Mason Fenwick & Lawrence  
Attorneys Patented Mar. 16, 1926.

1,576,649

UNITED STATES PATENT OFFICE.

ELI E. GREGORY, OF BROOKLYN, NEW YORK.

MOTOR FOR ANIMATED ADVERTISING SIGNS.

Application filed February 26, 1925. Serial No. 11,900.

*To all whom it may concern:*

Be it known that I, ELI E. GREGORY, a citizen of the United States, residing at Brooklyn, in the county of Kings and State of New York, have invented certain new and useful Improvements in Motors for Animated Advertising Signs; and I do hereby declare the following to be a full, clear, and exact description of the invention, such as will enable others skilled in the art to which it appertains to make and use the same.

My invention relates particularly to electrically controlled thermostatic devices for imparting motion to the movable feature, such as a pointing or directing hand or arm, of advertising signs, a special aim of my invention being to increase the throw or range of motion of the movable feature without increasing the electric power.

Another aim of my invention is to provide a simple and efficient device for maintaining the vibratory motion of the moving feature in each of its thrown positions.
To these and other ends, my invention consists in combining with the moving feature, an actuating element, a spring element under tension in operative relation to the actuating element, a fulcrum on which the spring element presses, a flexible thermostatic element to throw the spring element over its fulcrum, an electric element to heat the thermostatic element, an electric circuit, means whereby the flexing of the thermostatic element by the electric heat breaks the electric circuit, and thus reflexes the thermostatic element, so that the feature actuating element is reciprocated, substantially as hereafter described and claimed.
My invention also consists of a light coiled spring interposed by a novel construction and arrangement between the moving feature and its actuating element so that the vibration of the moving feature will be maintained in each of its positions.

My invention also comprises other features as hereafter fully described and claimed.

In order that my invention may be fully understood I shall first describe in detail the manner in which I at present prefer to carry my invention into practice and then particularly point out its novel features in the claims.
Figure 1 is a side elevation of an electrically controlled thermostatic motor embodying my invention and particularly intended for actuating the moving feature of animated advertising signs, the moving feature, in this instance a hand, being shown in one of its positions.

Figure 4 is a detail view showing my improved means for attaching the feature vibrating spring to the actuating element.

Figures 5 and 6 represent modifications of the specific form of my motor shown in Figures 1, 2 and 3.

Figure 1:
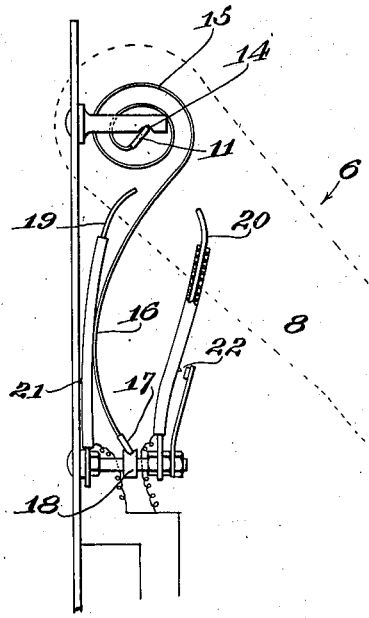
Figure 2:
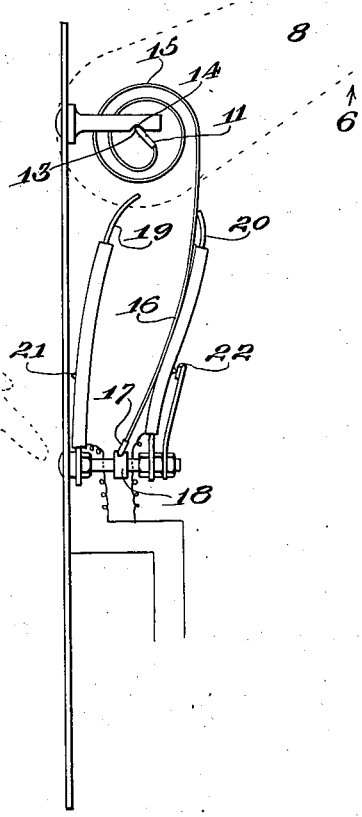
Figure 2 is a similar view of the same showing the hand thrown by the motor into its other position.
Figure 3:
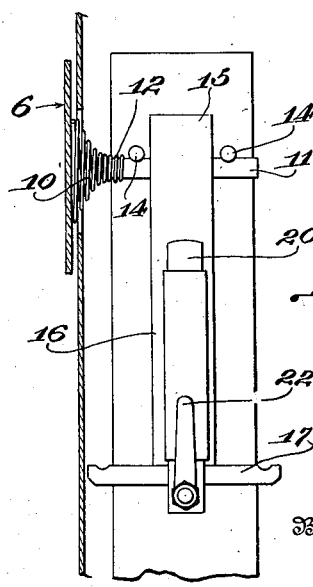
Figure 3 is a front elevation of the same, part being omitted to reveal the construction.

Referring first to Figures 1, 2, 3 and 4, the number 6 indicates the moving feature of any animated advertising sign, which in this application of my invention, is shown as a pointing hand 7 and forearm 8 to be swung back and forth into two positions as indicated in Figures 1 and 2 respectively.

To cause the hand 7 to continue vibrating after being thrown into each position, I prefer to attach thereto the free arm 9 of a light coiled spring 10, the inner end of which is attached to the motor actuated element, in this case a short shaft 11, preferably by the following means.

The inner end of the coiled spring 10 is bent, as on a mandrel, so as to form a plurality of, in this instance, three triangular coils 12, whose respective angles are staggered peripherally with relation to each other as shown best in Figure 4.

These staggered coils 12 are pressed into correspondence, when slipped over the shaft 11, then the triangular coils 12 will, by their elastic tendency to return to their relatively staggered positions, firmly grip the shaft 11 and thus bind the coiled spring securely thereto.

The shaft 11 is formed with a pivotal or knife edge 13, which is mounted to rock on a transverse fulcrum bearing 14, and the shaft 11 itself is fixed transversely to the end of a strong preferably coiled spring 15, the other end of which forms a spring arm 16. Transversely to and across the end of the spring arm 16 is fixed another pivotal or knife edge 17, which is mounted to rock on a bearing or fulcrum 18, against which the pivotal edge 17 is pressed by the restrained tension of the spring 15.

The arrangement is such that when the spring arm 16 is pressed laterally from the position shown in Figure 1, over its center of tension, it will be thrown with the feature hand 7 to a corresponding distance on the other side of the center of tension, and vice versa.

The light coiled spring 10, compressed by such throw of the hand will then cause the hand to vibrate in such position, until it is thrown into the opposite position.

For pressing the spring arm 16 laterally back and forth over its center as described, I prefer to use flexible thermostatic arms 19 and 20 arranged on opposite sides of the spring arm and having electric heating wires or elements coiled around them, and electric circuit makers 21 and 22 in operative relation thereto, the arrangement being such that when the left hand thermostatic element 19 is in circuit, and the spring arm 16 is on that side, the electric heating of the element 19, will cause it to bend and throw the spring arm 16 over its center to the right, thus throwing the feature hand as described. At the same time the circuit maker 21 will be opened, the element 19 cooled, and the opposite circuit maker 22 closed. The left hand thermostatic element 20 will then be heated and bent to the left, throwing the spring arm 16 to the left, and throwing the vibrating feature hand as described.

This abrupt reciprocation and consequent prolonged vibration of the feature will thus continue as long as the electric current is maintained.

In Figure 5, is illustrated another embodiment of my invention, the thermostatic elements 23 being alternately heated and cooled by continuously heated resistance coils 24 separate from, but in proximity to the opposite position of the elements 23, so that without any circuit closing or opening, the heated coils 24 will cause the elements 23, as they alternately approach the coils, to alternately flex, throw over and be thrown over by the spring arm 25.

It is evident that many other equivalent arrangements of the heating and thermostatic elements, and the jumping spring arm may be made to reciprocate the vibratory feature and its actuating element, without departing from the boundaries of my invention as defined by the following claims.

For a further example, Figure 6 shows the coiled spring element 26 having its compressed spring arm 27 forming the thermostatic element, around which is coiled the heating element 28, the element 27 being arranged itself alternately to make and break contact with an electric contact 29, so that the feature vibrating shaft or element 30 will be abruptly rocked as described on its fulcrum and the feature thus effectually vibrated by the resulting jumping motion of its actuating element.

I claim as my invention:

1. The combination, with a movable feature, of its actuating element, a compressed spring element in operative relation to the actuating element, a fulcrum on which a free end of the spring element rocks, a thermostatic element in operative relation to the spring element, and an electric heating element in operative relation to the thermostatic element.

2. The combination, with a movable feature, of its actuating element, a compressed spring element in operative relation to the actuating element, a fulcrum on which a free end of the spring element rocks, a thermostatic element in operative relation to the spring element, an electric heating element in operative relation to the thermostatic element, a circuit maker in operative relation to the thermostatic element, and an electric circuit.

3. The combination with a movable feature, its actuating element, a compressed spring element, a fulcrum, a thermostatic element, and a heating element all in operative relation as described, of a light coiled spring interposed between the feature and its actuating element to cause the feature to vibrate when thrown as described.

4. The combination, with the movable feature, its actuating rock shaft, its fulcrum, a compressed spring element, a thermostatic element and a heating element all in operative relation as described, of a coiled spring having one end attached to the movable feature, and the other end bent into a plurality of staggered angular coils binding the rock shaft as described.

In testimony whereof I affix my signature.

ELI E. GREGORY.